(No Model.) 2 Sheets—Sheet 1.
J. A. HEARD.
COMBINED CULTIVATOR AND HARROW.
No. 494,986. Patented Apr. 4, 1893.
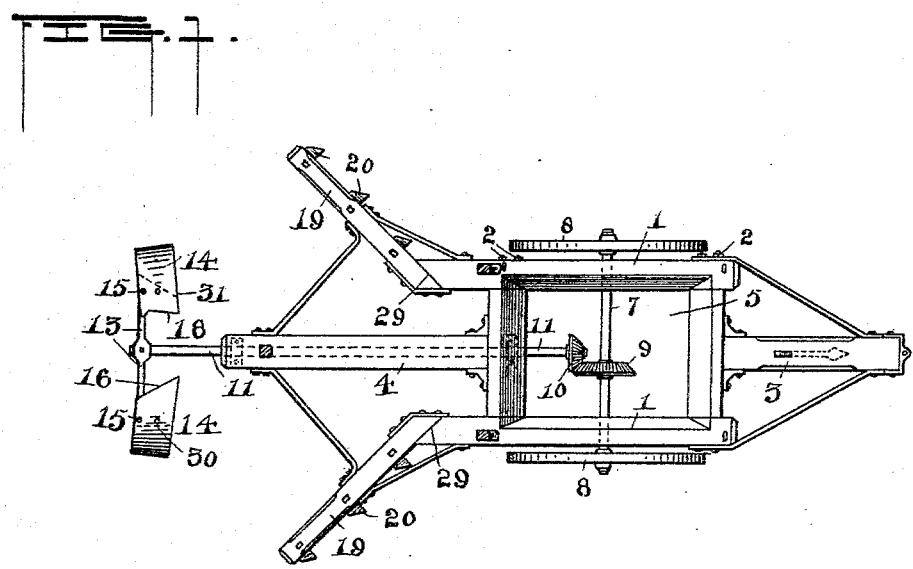
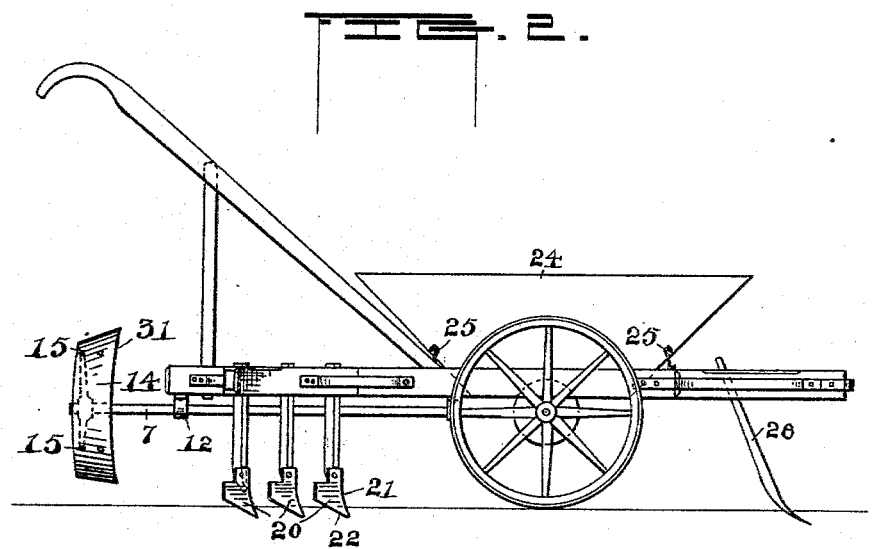
WITNESSES
Arch. M. Catlin.
O. H. Kean.
INVENTOR
John A. Heard
by Benj. R. Catlin
atty.
THE NORRIS PETERS CO., PHOTO-LITHO., WASHINGTON, D. C.

(No Model.) 2 Sheets—Sheet 2.
J. A. HEARD.
COMBINED CULTIVATOR AND HARROW.
No. 494,986. Patented Apr. 4, 1893.
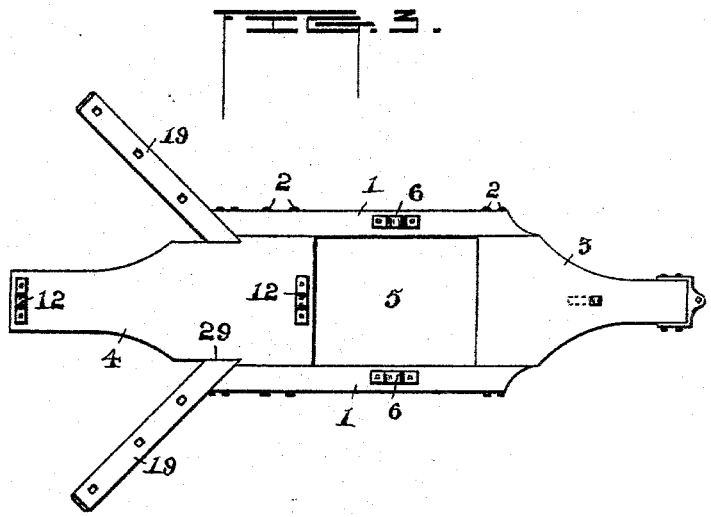
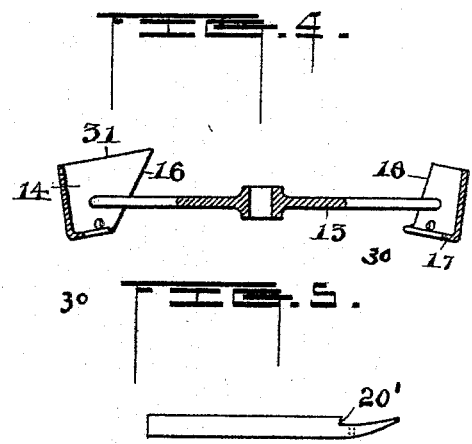
WITNESSES
Arch. M. Catlin.
O. H. Kenn.
INVENTOR
John A. Heard
by Benj. R. Catlin
Atty

UNITED STATES PATENT OFFICE.

JOHN A. HEARD, OF NEW ALBANY, MISSISSIPPI.

COMBINED CULTIVATOR AND HARROW.

SPECIFICATION forming part of Letters Patent No. 494,986, dated April 4, 1893.

Application filed August 23, 1892. Serial No. 443,857. (No model.)

*To all whom it may concern:*

Be it known that I, JOHN A. HEARD, a resident of New Albany, in the county of Union and State of Mississippi, have invented certain new and useful Improvements in a Combined Cultivator and Harrow; and I do hereby declare the following to be a full, clear, and exact description of the invention, such as will enable others skilled in the art to which it pertains to make and use the same.

The invention relates to an agricultural implement adapted to plant and cultivate corn, cotton and the like and also to "chop" cotton and similar crops and its object is to enlarge the efficiency of such implements without unduly increasing their cost; and the invention consists in the construction hereinafter described and particularly pointed out.

In the accompanying drawings: Figure 1 is a plan. Fig. 2 is a side elevation; and Fig. 3 is a plan of the frame. Figs. 4 and 5 are views of details.

The frame of the implement which may be called a combined cultivator and harrow, consists of the side beams 1, secured by bolts 2 on opposite sides of the center beams 3 and 4. These several parts are arranged as shown so as to leave an opening 5 suitable for seating a hopper as will be explained. The usual handles are fastened to the side beams. Upon the under side of said beams 1 are provided bearings 6 for the ends of an axle 7, upon which are made fast in any convenient manner the wheels 8. A bevel gear indicated by 9 is made fast upon axle 7 and arranged to mesh with a gear 10 fast on a revolving shaft 11 having bearings 12 supported on the under side of central beam 4. To the shaft 11 are secured at substantially right angles thereto arms 13 to which are detachably fastened by bolts 15 the convex cutting blades 14. These blades are interiorly concaved. They are furnished with an obliquely arranged cutting edge 16 as shown, adapted to make a shearing cut in the earth when suitably revolved. When the blade is in position to immediately enter the ground its point is nearer a vertical plane passing through the shaft 11 than said heel, whereby the point enters the ground first and the forward movement of the machine is so compensated for that the blade makes practically a straight cut across the row, the flange serving to prevent any spilling of the dirt directly to the rear.

17 indicates a flange arranged at substantially right angles to the body of the blade and adapted to prevent dirt and plants which may be underrun and cut or "chopped" by the blades from passing off at the rear edge and to compel them to rest in the concavity of the blade until the upward movement of the latter withdraws it from under them circumferentially, or in other words, until the dirt, plants and weeds are delivered from the edge 18 as it passes under them and ascends toward the upper part of its path.

It will be observed that the forward edge 31 of each curved blade is flared outwardly so that the point of the shearing edge 16, penetrates the soil sooner and more deeply than the heel of the blade. Said heel and that portion of the blade in contact with the arms and the outer ends of said arms revolve near the surface.

30 indicates supplemental bolt holes to receive bolts 15 which may if desired be formed integrally with arms 13 whereby the relative position of the blades can be varied so that they will not penetrate to so great a depth.

To the beam 4 are secured in any suitable manner the harrow beams 19 in which are removably secured the harrow teeth. Preferably the side beams 1 are beveled at 29 and the harrow beams fitted between them and the central beam 4 as shown, the whole being fastened by straps and bolts. These teeth have a suitable chiseled or other shaped point and are provided with a notched face 20' to receive the shank of a shovel blade and also with a bolt hole in said notched part. The chisel shaped point is preferred because it is best adapted for the attachment of a shovel shank. To these are detachably fastened the peculiarly shaped shovel blades 20. These have each a straight edge 21 situated near and practically in line with the tooth to which it is bolted. 22 denotes a shear edge. The detachable blades can be oppositely arranged to throw the earth either outwardly or inwardly as desired by transposing those on the right to the left side and vice versa.

When run between rows of corn or cotton the convex blades shear the earth and weeds transversely at short intervals along the central lines between the rows without any considerable displacement of the same.

If it is desired to simply stir the earth the lateral blades 20 are omitted and the harrow teeth used without them. When it is desired to hill the row or throw earth toward the plants, the blades are employed, being suitably disposed for the purpose. In some cases it is desirable to throw earth to the center and the shovel blades can be arranged with their shear edges on their adjacent sides to effect that also. To chop a row it is straddled by the driving wheels and the curved blades will then cut out the young plants at any suitable distance, proper gears being supplied as desired to provide for varying the number of the revolutions of said blades. The gears can be made detachable and interchangeable for this purpose. To throw earth toward the row in chopping cotton or the like the blades 20 are arranged with their shearing edge toward the plants. If these are quite small or if for any reason it is not desired to hill up, these blades may be omitted and the teeth relied upon to stir the earth, or if desired in any particular case the blades may be arranged when chopping to throw earth to the center of the rows.

Having described my invention, what I claim is—

1. In an agricultural implement the combination of the axle 7 and shaft 11 geared together, the chopping blades secured upon the arms of the shaft, said blades each having a shearing edge 16 arranged obliquely to the shaft and flaring outwardly, its point when in position to enter the ground being nearer a vertical plane through the shaft than the heel whereby an oblique cut across the row is avoided; substantially as set forth.

2. In an agricultural implement the combination of the axle 7 and shaft 11 geared together, the chopping blades secured upon the arms of the shaft, said blades each having a shearing edge 16 arranged obliquely to the shaft and flaring outwardly, and having also a flange 17 to prevent the dirt from passing off the blade lengthwise of the machine; substantially as set forth.

3. In an agricultural implement the combination of the axle 7 and shaft 11 geared together, the chopping blades fast on said shaft and the harrow, provided with harrow teeth adapted to receive the removable shovel teeth whereby the earth on each side of the row of plants may be harrowed or hilled as desired and the plants in the row chopped; substantially as set forth.

4. In an agricultural implement the combination of the shaft, mechanism for revolving it, arms 13 on said shaft, bolts 15, and the shearing blades provided with supplemental holes 30 for adjusting the cutting depth of the blades; substantially as set forth.

In testimony whereof I have signed this specification in the presence of two subscribing witnesses.

JOHN A. HEARD.

Witnesses:
W. B. ROBBINS,
H. MARSHALL.